United States Patent [19]

Wechsler et al.

[11] Patent Number: 5,160,917
[45] Date of Patent: Nov. 3, 1992

[54] ENERGY BEAM POSITION DETECTOR

[75] Inventors: Monroe S. Wechsler; Scott T. Carey, both of Ames, Iowa

[73] Assignee: Iowa State University Research Foundation, Inc., Ames, Iowa

[21] Appl. No.: 538,135

[22] Filed: Jun. 14, 1990

[51] Int. Cl.⁵ .............................................. G01P 13/00
[52] U.S. Cl. .................................. 340/686; 250/526; 337/395; 374/6
[58] Field of Search ..................... 340/686; 250/526; 374/6; 337/395, 140

[56] References Cited

U.S. PATENT DOCUMENTS

| | | | |
|---|---|---|---|
| 3,594,674 | 7/1971 | Wilson | 337/140 X |
| 3,684,994 | 8/1972 | Tyler | 337/395 X |
| 3,711,718 | 1/1973 | Paul | 374/6 X |
| 4,191,053 | 3/1980 | Hart et al. | 374/112 |
| 4,205,293 | 5/1980 | Melton et al. | 337/140 |
| 4,371,791 | 2/1983 | Mercier | 307/141 |
| 4,371,954 | 2/1983 | Cornet | 365/126 X |
| 4,490,975 | 1/1985 | Yaeger et al. | 60/527 |
| 4,520,336 | 5/1985 | Hastings et al. | 337/107 X |
| 4,531,988 | 7/1985 | Todoroki et al. | 148/402 |
| 4,551,975 | 11/1985 | Yamamoto et al. | 60/528 |
| 4,601,283 | 7/1986 | Chikama | 128/4 |
| 4,687,315 | 8/1987 | Fujii | 355/3 |
| 4,700,541 | 10/1987 | Gabriel et al. | 60/528 |
| 4,734,047 | 3/1988 | Krumme | 439/161 |
| 4,747,887 | 5/1988 | Honma | 148/131 |
| 4,761,955 | 8/1988 | Bloch | 60/528 |
| 4,793,715 | 12/1988 | Kasner et al. | 374/6 |
| 4,832,444 | 5/1989 | Takehshi et al. | 350/96.26 |
| 4,933,951 | 6/1990 | Heinzman | 374/6 X |
| 5,004,318 | 4/1991 | Ohashi | 350/96.21 X |

FOREIGN PATENT DOCUMENTS

| | | | |
|---|---|---|---|
| 906622 | 8/1972 | Canada | 340/686 |
| 158595 | 1/1983 | Fed. Rep. of Germany | 250/526 |
| 66109 | 3/1987 | Japan . | |
| 218912 | 9/1987 | Japan . | |
| 30192 | 2/1988 | Japan . | |

OTHER PUBLICATIONS

*Patent Abstracts of Japan:* Grp. P609, vol. 11, No. 261 published Aug. 25, 1987 (62-66109); Grp. P677, vol. 12, No. 86 and published Mar. 18, 1988 (62-218912); and Grp. M715, vol. 12, No. 236, published Jul. 6, 1988 (63-30192).

*Primary Examiner*—Tom Noland
*Attorney, Agent, or Firm*—Zarley, McKee, Thomte, Voorhees & Sease

[57] ABSTRACT

An energy beam position detector including a shape memory alloy wire positioned at a boundary of acceptable beam trajectory. The wire is held under adjustable tension. A contraction detector monitors contraction of the wire. If the beam strays, is misaligned, or spreads and strikes the wire, the contraction detector can actuate a switch to alert personnel, shut off the beam, or can exert a force to enable other remedial action be taken.

6 Claims, 2 Drawing Sheets

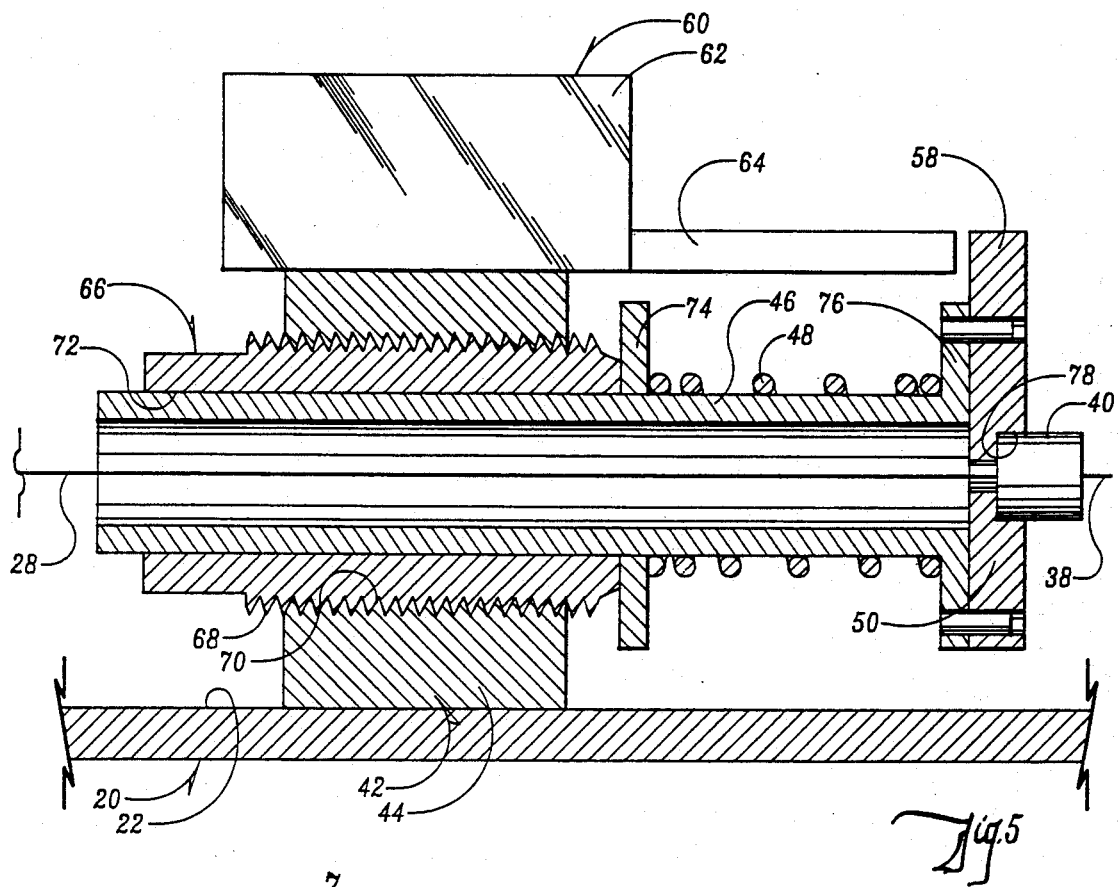
Fig. 5
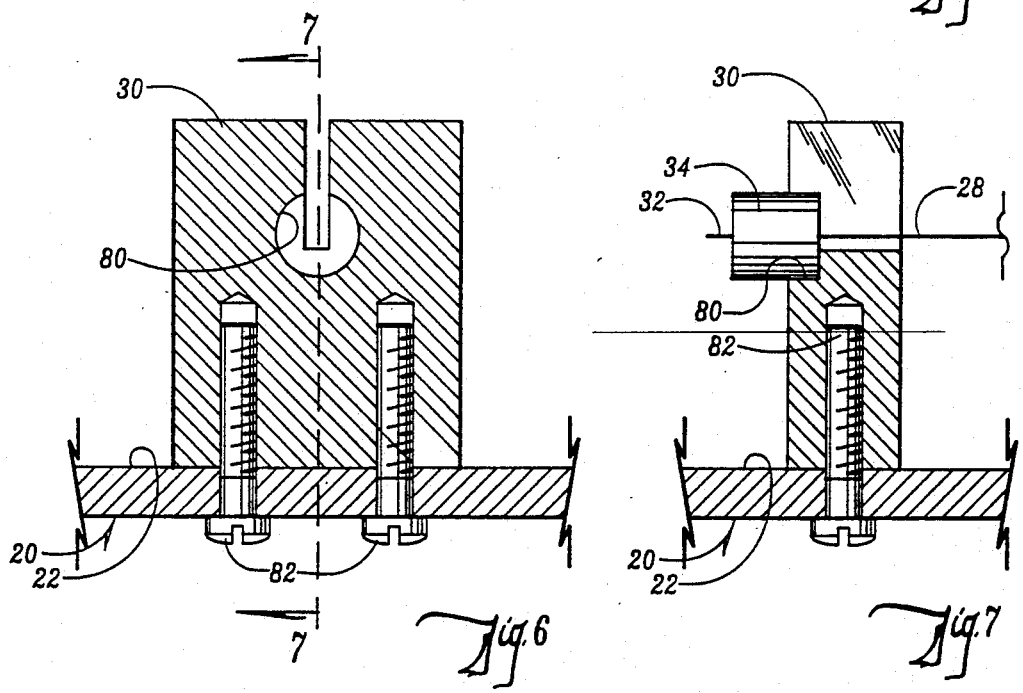
Fig. 6
Fig. 7

1

ENERGY BEAM POSITION DETECTOR

BACKGROUND OF THE INVENTION a. Field of the Invention

The present invention relates to energy beam detectors, and in particular a means and method to detect unacceptable misalignment, straying, or spreading of an energy beam.

b. Problems in the Art

In many situations where energy beams (for example, charged particles, neutrons, and electromagnetic radiation, such as laser beams) are utilized, whether for testing, analysis, or some other utilization, any straying of even a portion of the beam outside of acceptable boundaries could be detrimental. Many times, it could be destructive of equipment, or even dangerous to the health of personnel.

For example, in a linear proton accelerator (for example, the Los Alamos Meson Physics Facility, LAMPF), a proton beam is required to be propagated along a linear tube, which can be many hundreds of feet long. A typical proton beam is created to be one to two inches in diameter. A typical tube can be four inches in diameter.

If a proton beam strays and strikes the wall of the tube, it certainly disrupts the utilization of the beam. More importantly, it can cause the tube to become radioactive. This can cause significant and detrimental down-time, and can impose critical risk to the health and well-being of the personnel involved.

Similarly, other energy beam applications have detrimental risks if the beam traverses predetermined and standard boundaries.

Energy beams can stray from boundaries by being misaligned, by veering from an intended path, or by defocusing or spreading, to name a few.

It would be useful, and therefore there is a need in the art, for a means and method to detect when an energy beam traverses acceptable boundaries.

It is therefore a principal object of the present invention to provide an energy beam position detector which improves over or solves the deficiencies and problems in the art.

It is a further object of the present invention to provide a detector as above described which reliably and comprehensively detects misalignment, spreading, straying, or other undesired propagation of an energy beam.

Another object of the present invention is to provide a detector as above described which can both detect misalignment and then actuate external means for identifying, notifying of, or otherwise dealing with the misalignment.

A further object of the present invention is to provide a detector as above described which can be easily placed at multiple positions along a beam pathway.

Another object of the present invention is to provide a detector as above described which can easily be adapted to different beam boundaries.

Another object of the present invention is to provide a detector as above described which provides reliable and rapid information or action.

A further object of the present invention is to provide a detector as above described which is flexible and adjustable in its use.

A further object of the present invention is to provide a detector as above described which is economical, efficient, and durable.

These and other objects, features, and advantages of the present invention will become more apparent with reference to the accompanying specification and claims.

SUMMARY OF THE INVENTION

The present invention relates to a method and a detector for detecting energy beams (for example, charged particles, neutrons, and electromagnetic radiation, such as laser beams) which traverse acceptable boundaries. The invention includes a shape memory alloy wire which, at least in part, is positioned along at least some of the predetermined boundary. If an energy beam, or any part thereof, strays to the point of being sufficiently proximal to, or strikes the wire, producing sufficient heating in the wire to cause shape memory contraction, the contraction is monitored. If the amount of contraction exceeds a predetermined minimum, an actuator is operated and produces a signal. The actuator can function to alert personnel to the misalignment or spreading of the beam, can cause the beam to shut down, or can perform some other function to mitigate the effect of or discontinue such misalignment or spreading.

The invention can be flexibly adapted to a variety of different positions or boundary shapes. It can also be adjusted in sensitivity. Furthermore, a plurality of detectors can be positioned along the path of the beam for increased monitoring ability.

BRIEF DESCRIPTION OF THE DRAWINGS

FIG. 5 is a partial sectional view taken along lines 5—5 of FIG. 2.

FIG. 6 is a partial sectional view taken along lines 6—6 of FIG. 4.

FIG. 7 is a partial sectional view taken along lines 7—7 of FIG. 6.

DETAILED DESCRIPTION OF THE PREFERRED EMBODIMENT

Figure 1:
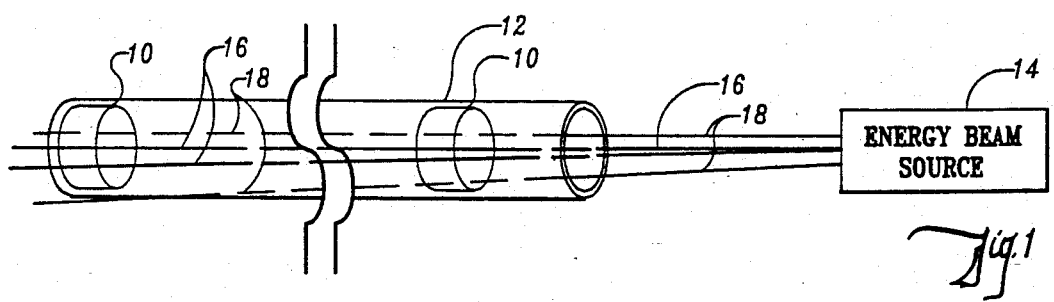
FIG. 1 is a partial schematic, partial perspective view of a preferred embodiment of the invention as applied to an energy beam system.

A detailed description of the preferred embodiment of the present invention will be set forth below. This description is to aid in an increased understanding of the invention, but does not limit the scope thereof, which is defined solely by the claims following this description.

The drawings, FIGS. 1-7 are part of this detailed description and should be referred to. Reference numerals are utilized to indicate various parts and features in the drawings. Like reference numerals will be used to identify like parts and features with respect to all the drawings.

FIG. 1 diagramatically depicts the invention. In this preferred embodiment, the energy beam source 14 is a linear proton accelerator system. Two detectors 10, according to the present invention are mounted at spaced apart positions along containment tube 12 of the LAMPF system. Tube 12 is straight or linear, and can extend for many hundreds of feet. In the preferred embodiment, its inside diameter can be four inches.

A linear proton accelerator means 14 generates and propagates an energy beam, and specifically, a proton beam 16. The beam is focused and behaves linearly. It can therefore be aimed to propagate through tube 12. The general desired beam width of beam 16, in the preferred embodiment, is on the order of 1.5 inches. If it is therefore properly focused, and does not undesirably spread, it can traverse tube 12 without striking tube 12.

Detectors 10, however, can allow automatic monitoring of beam 16. If, for example, as shown in FIG. 1, a beam 18 were propagated by accelerator 14, where beam 18 spread was undesirably unfocused, it would be detected by one or both of detectors 10. Detectors 10 would actuate a signal which could be used to instruct supervisory personnel of the problem, or even operate to shut down the accelerator means 14, or otherwise function to mitigate any possible damage that would be caused by the undesirable beam 18.

FIGS. 2-7 specifically show the structure of the preferred embodiment of detector 10. Each of these figures shows a different perspective or component of detector 10 for added clarity of the description of the invention.

Figures 2, 3:
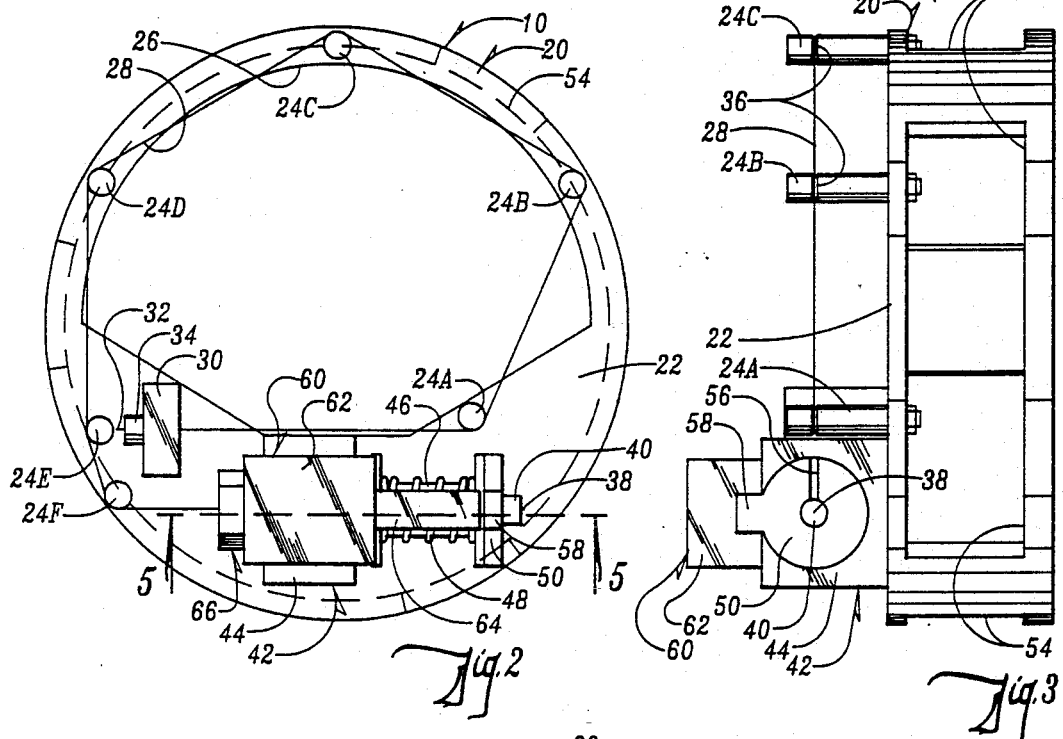
FIG. 2 is a front elevational view of a preferred embodiment of the detector according to the invention.
FIG. 3 is a side elevational view of FIG. 2.

By referring particularly to FIG. 2, it can be seen that a circular frame 20 defines the outside diameter of detector 10. As is readily understood in the art, the outside diameter of frame 20 would be selected to almost match the inside diameter of tube 12. Detector 10 could therefore be slidably inserted into tube 12 and be supported without mounting structure. Alternatively, as is readily within the skill of those skilled in the art, mounting means could be utilized to fix a detector in a desired position along tube 12.

The middle of frame 20 is generally open to allow for passage of a beam 16. On face 22 of frame 20 there are positioned generally around the perimeter of frame 20 a plurality of spaced apart posts 24 A-F.

For purposes of this description, the path through opening or aperture 26 of frame 20 shall be referred to as the beam axis or beam axis for the invention. The posts 24 extend generally parallel to the beam axis and support a shape memory alloy wire 28 which is stretched in tension around the outside of posts 24. Wire 28, thereby roughly approximates the inside circumference of tube 12, and serves as a definition of a boundary for the energy beam through tube 12.

In the preferred embodiment, wire 28 is equiatomic or nearly equiatomic Ni-Ti (nickel titanium). Such a material, also called shape memory effect material, is well known in the art. This particular bi-metal composition was chosen because of the vigorous fashion in which it exhibits the phenomenon of shape memory.

It is furthermore known that if a shape memory alloy is held under tensile stress while transforming, the material will contract when it transforms back to the high temperature phase and the amount of contraction increases with increasing stress. See for example, C. H. Hsu, and M. S. Wechsler, "The Effect of Applied Stress on the Transformation Behavior of Ni-Ti", *Solid-Solid Phase Transformations*, pp. 1293-97, edited by H. I. Aaronson, et al., The Metallurgical Society of AIME, Warrendale, Pa., 1982, which is incorporated by reference herein.

FIG. 2 depicts an anchor block 30 mounted to face 22 of frame 20. End 32 of wire 28, includes an end cap 34 which is welded thereto. Wire 28 is slid laterally through a slot in anchor block 30 and then pulled taught until end cap 34 abuts one side of anchor block 30. Wire 28 is then positioned around the exterior facing sides of post 24 A-F, which has grooves 36 (see FIG. 3) to position wire 28 at a desired spaced apart distance from face 22 of frame 20.

The opposite end 38 of wire 28, also has an end cap 40 welded thereto. End 38 is mounted to a spring loaded actuator 42, which is fixedly mounted to face 22 of frame 20.

As can be seen in FIG. 2, actuator 42 includes a base 44 which is the portion of actuator 42 fixed to frame 20. A translatable push-rod 46, biased to an outward extended position by spring 48, has an end plate 50 which has a slot allowing wire 28 to be slid transversely therethrough, and seating end cap 40 of end 38 of wire 28 in the position shown in FIG. 2.

It is to be understood that the wire 28 and the fixed positioning of end caps 34 and 40 are selected so that when wire 28 is installed as shown in FIG. 2, it is held under tension. Spring 48 would bias push-rod 46 in a direction to the right in FIG. 2 and accomplish the tensioning of wire 28.

It can therefore be seen that detector 10 presents wire 28 to define a boundary for the energy beam passing through detector 10 and tube 12, when detector 10 is positioned in tube 12. If the energy beam were to spread, such as shown by beam 18 in FIG. 1, to the point it becomes sufficiently adjacent or strikes wire 28, as shown in FIG. 2, the inherent properties of wire 28 would result in a contraction of wire 28. This in turn, would cause end cap 40 at end 38 of wire 28 to exert a force on end plate 50 at push rod 46. If the contraction of wire 28 is sufficient, it will overcome the outward biasing force of spring 48 causing push-rod 46 to move to the left in FIG. 2.

The sensitivity of actuator 42 is adjustable. An adjustment nut 52, can be used to adjust the tightness and, thus, biasing force of spring 48. Therefore, actuator 42 can be precalibrated to cause an actuation signal to be produced upon a certain level of movement of push rod 46.

FIG. 3 shows from another angle detector 10. It can be seen that post 24 A-F are bolted to face 22 of frame 20. Actuator 42 can likewise be bolted or otherwise fixed to face 22 by means known in the art. It is noted that cut-out portions along the side wall of frame 20 allow easy access to its interior and reduce the amount of weight and material of frame 20.

FIG. 3 shows in detail end plate 50. End plate 50 is generally circular in shape, with slot 56 extending radially from an edge to its center. Slot 56, as previously described, is of sufficient width to receive wire 28, but is narrower than the width of end cap 40 of wire 28. It is to be understood that end plate 50 could also have a recess into which end cap 40 could seat, the recess being of a slightly larger diameter than end cap 40.

FIG. 3 also shows a tab 58 extending from the perimeter of end plate 50. Tab 58 is used to operate a switch means 60 (see FIGS. 4 and 5).

Figure 4:
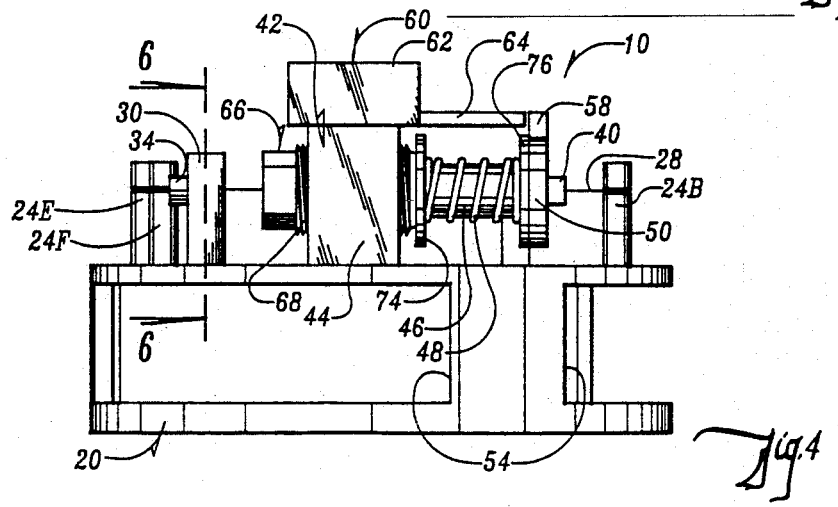
FIG. 4 is an opposite side elevational view of FIG. 2.

By referring to FIGS. 4 and 5, additional views of actuator 42 can be seen, along with details of switch means 60. Switch means 60 is fixed to actuator base 44. It includes a housing 62, from which extends a highly sensitive, translatable switch arm 64. Switch arm 64 is aligned with tab 58 of end plate 50 of push rod 46. Upon sufficient contraction of wire 28 and movement of end plate 50, end plate 50 contacts switch arm 64, pushing it into housing 62, and thereby triggering switch means 60. Micro switches such as switch means 60 are well known in the art and available from a variety of vendors. Ranges of sensitivity are available and can be selected according to desire.

By also referring to FIGS. 4 and 5, it can be seen that adjustment of the tension of actuator 42 utilizes a tensioning bolt 66 having exterior threads 68. Tensioning bolt 66 is threadably adjustable through base 44 of actuator 42, which has a mating interior threaded bore 70. Push-rod 46 extends slidably through a bore 72 and tensioning bolt 66.

Spring 48 is sandwiched between washer 74 at the right end of tensioning bolt 66 in FIG. 4, and flange 76 at the right end of push-rod 46 in FIG. 4. Therefore, as can be readily understood, threaded movement in a rightward direction in FIG. 4 of tensioning bolt 66 would cause increased compressive force on spring 48, biasing flange 76 of push-rod 46 outwardly. More force in an opposite direction would therefore be required of wire 28, when contracting, to overcome the biasing forces of spring 48. Movement of tensioning bolt 66 in the opposite direction would lessen the force on push-rod 46.

FIG. 5 also shows how end plate 50 is attachable by means well known in the art to flange 76 of push-rod 46. Attachment can be by screws, bolts, rivets, frictional pins, or other means. It can also be seen that end cap 40 can be seated into cut-out seat 78 in end plate 50.

FIG. 6 similarly shows that a cut-out seat 80 can be machined into anchor block 30 to receive end cap 34 of end 32 of wires 28. Anchor block 30 can also be fixed to face 22 of frame 20 by bolt 82.

FIG. 7 depicts how end cap 34 can be seated into cut-out seat 80 of anchor block 30.

It can therefore be seen that the preferred embodiment of the invention achieves at least all the stated objectives of the invention. It is to be understood that in the preferred embodiment, contraction of wire 28 can be generally on the order of 6 percent upon being impacted by an energy beam in the LAMPF system. Actuator 42 can be precalibrated accordingly so that such contraction will actuate switch means 60 which in turn could signal either personnel to take some countermeasure, or automatically shut off the beam totally, or in the affected region of the accelerator or other device.

In the preferred embodiment, the wire 28 is 20-mil-diameter Ni-Ti wire approximately 13.5 inches long with 3/16 inch diameter end caps. The distance of wire 28 from face 22 of frame 20 is approximately 0.5 inches. The tensioning of wire 28 is intended to take advantage of the increase in transformation strain with increasing stress, as previously discussed.

In operation, detector 10 is installed, in preferred embodiment, by the following procedure. End caps 34 and 40 are laser-welded onto wire 28. Wire 28 is then cooled to minus 50° centigrade, or lower. This can be accomplished by placing wire 28 into liquid nitrogen. End 32 of wire 28 is then anchored into anchor block 30 and appropriately seated. The wire is strung around posts 24 A-F. End 38 and end cap 40 of wire 28 are then threaded through hollow interior push-rod 46, which has been mounted inside tensioning bolt 66 with spring 48 surrounding it. End plate 50 is assembled onto flange 76 of push-rod 46 by utilizing slot 56 to allow wire 28 to pass to its center. End cap 40 is then seated into end plate 50 and end plate 50 is fixed to push-rod 46.

Finally, tensioning bolt 66 is threaded (for example, to the right in FIG. 4) to produce the required tightness in spring 48 and the desired stress on wire 28.

It is to be understood that in the preferred embodiment, spring 48 has a free length of 0.625 inches, a solid height of 0.172 inches, and a spring rate of 15 pounds/inch. To achieve a recovery strain of 6.5 percent for a stress of 10,000 pounds per square inch, tensioning bolt 66 should be advanced to 0.2 inches from the position where it just begins to contract spring 48. If wires are heated above the transformation temperature over a distance 1.5 inches or 3.8 centimeters, the displacement of tab 58 of end plate 50 should be $0.065 \times 1.5 = 0.098$ inches = 2.5 millimeters. The positioning of switch means 60 can thus be appropriately set.

It will be appreciated that the present invention can take many forms and embodiments. The true essence and spirit of this invention are defined in the appended claims, and it is not intended that the embodiment of the invention presented herein should limit the scope thereof.

For example, detector 10 can be used for other similar applications where an energy beam needs to be detected. The invention does not necessarily need to have the wire strung to define generally a circular boundary. It could define a linear or other geometric boundary, or a boundary of essentially any shape where the wire can be kept under tension. It may be desired, for example, to only detect if the energy beam strays or spreads in one direction, rather than in any direction.

Furthermore, it is to be understood that sensitivity of detector 10 might be increased in certain ways. Two examples are to use a number of closely spaced turns of wire wound around the same posts 24 A-F. A significant increase in sensitivity should be realized in this way. A second example would be to surround wire 28 with a sleeve material of a heavy metal. Heat deposited in the sleeve material from the errant beam would then be conducted into the wire, facilitating its increase in temperature.

What is claimed is:

1. A method of detecting unacceptable misalignment, straying, or spreading of an energy beam comprising:
   positioning a shape memory alloy wire means along at least a portion of a boundary of acceptable beam trajectory, the shape memory alloy changing length in response to changes in temperature;
   monitoring changes in length of the wire; and
   producing a signal when the length of the wire changes a predetermined amount in response to proximity of the beam to the wire.

2. The method of claim 1 where the boundary of acceptable beam trajectory includes a boundary for acceptable spreading of an energy beam.

3. The method of claim 1 further comprising anchoring one end of the wire with respect to an opposite end.

4. The method of claim 1 further comprising connecting a switching means to the wire to detect changes in wire length.

5. The method of claim 1 further comprising maintaining the wire in tension.

6. The method of claim 5 further comprising maintaining the wire in adjustable tension.

* * * * *